United States Patent
Holaus (10) Patent No.: US 12,322,934 B2
(45) Date of Patent: Jun. 3, 2025

(54) FLANGE DESIGN FOR HIGH-VOLTAGE GAS-INSULATED SWITCHGEAR (GIS), BUSBARS AND LINES (GIL)

(71) Applicant: Hivoduct AG, Kemptthal (CH)

(72) Inventor: Walter Holaus, Glattfelden (CH)

(73) Assignee: Hivoduct AG, Kemptthal (CH)

( * ) Notice: Subject to any disclaimer, the term of this patent is extended or adjusted under 35 U.S.C. 154(b) by 396 days.

(21) Appl. No.: 18/015,153

(22) PCT Filed: Jul. 21, 2020

(86) PCT No.: PCT/EP2020/070540
§ 371 (c)(1),
(2) Date: Jan. 9, 2023

(87) PCT Pub. No.: WO2022/017584
PCT Pub. Date: Jan. 27, 2022

(65) Prior Publication Data
US 2023/0253768 A1    Aug. 10, 2023

(51) Int. Cl.
*H02B 13/045*    (2006.01)
*H02G 5/06*    (2006.01)

(52) U.S. Cl.
CPC .......... *H02B 13/045* (2013.01); *H02G 5/063* (2013.01)

(58) Field of Classification Search
CPC ........ H02B 13/045; H02G 5/063; H02G 5/10; H02G 5/002; H02G 3/0406; H02G 15/013;
(Continued)

(56) References Cited

U.S. PATENT DOCUMENTS

| 3,585,270 A | 6/1971 | Trump |
| 4,666,189 A * | 5/1987 | Taylor .................... F23J 13/025 |
| | | 126/307 R |

(Continued)

FOREIGN PATENT DOCUMENTS

| DE | 2603040 A1 | 8/1977 |
| DE | 3347006 A1 | 7/1985 |

(Continued)

OTHER PUBLICATIONS

Written Opinion by the ISA for PCT/EP2020/070540 mailed Mar. 18, 2021.

*Primary Examiner* — Adam B Dravininkas
(74) *Attorney, Agent, or Firm* — GrowIP Law Group LLC (57) ABSTRACT

The invention relates to enclosures (1) for gas-insulated medium-voltage or high voltage apparatuses. A connection portion (4) between a first end (20) of the first enclosure tube (2) and a mating machined second end (30) of the second enclosure tube (3) has a gas-escape path (L) running from the inside (6) to the outside (7) of the enclosure tubes (2, 3). According to the invention, the gas-escape path (L1) is shaped to have a first segment (L1) running along an at least partially axial direction of the enclosure (1) and being equipped with least one sealing ring (5; 5a, 5b). In addition, a slim ring-like snap-on bracket (9) can be used. The direct machining of the mating enclosure ends (20, 30) allows to omit conventional flanges. The partially axial orientation of the gas-escape path (L) allows to provide plural sealing rings (5; 5a, 5b) in series in the gas-escape path (L).

23 Claims, 6 Drawing Sheets

(58) Field of Classification Search
CPC .. H02G 3/22; H02G 9/06; H02G 15/04; F16L 5/10; F16L 19/0218; F16L 37/08
See application file for complete search history.

(56) References Cited

U.S. PATENT DOCUMENTS

| | | | | |
|---|---|---|---|---|
| 4,867,490 | A  * | 9/1989 | Arnoldt | F16L 23/08 |
| | | | | 285/424 |
| 5,933,556 | A  * | 8/1999 | Hawkins | F16L 37/0985 |
| | | | | 385/56 |
| 6,254,144 | B1 * | 7/2001 | Hagan | B60T 17/043 |
| | | | | 285/322 |
| 6,708,985 | B1 * | 3/2004 | Doyle | F16L 19/0218 |
| | | | | 285/379 |
| 2008/0191426 | A1 * | 8/2008 | Doyle | F16J 15/061 |
| | | | | 277/616 |
| 2011/0133415 | A1 * | 6/2011 | Vu | F16J 15/061 |
| | | | | 277/608 |
| 2020/0224817 | A1 * | 7/2020 | Schulz | F16L 59/184 |

FOREIGN PATENT DOCUMENTS

| | | |
|---|---|---|
| DE | 102011086663 A1 | 5/2013 |
| EP | 0083092 A2 | 7/1983 |
| GB | 1217810 A | 12/1970 |

\* cited by examiner

FLANGE DESIGN FOR HIGH-VOLTAGE GAS-INSULATED SWITCHGEAR (GIS), BUSBARS AND LINES (GIL)

CROSS-REFERENCE TO RELATED APPLICATIONS

This application is a U.S. National Stage Application that claims the benefit of the filing date of International PCT Application No. PCT/EP2020/070540, filed on Jul. 21, 2020, that is hereby incorporated by reference in its entirety.

FIELD OF THE INVENTION

The present disclosure relates to the field of high-voltage and medium-voltage gas-insulated switchgear (GIS), gas-insulated busbars and gas-insulated lines (GIL). A compact flange design comprised in gas-tight enclosure tubes is disclosed, which provides a rigid but removable mechanical connection and gas sealing for pressurized insulation gas contained therein. Furthermore, the present disclosure relates to a gas-insulated medium-voltage or high-voltage apparatus comprising such a flange, and to a method for producing and assembling an enclosure for gas-insulated medium- or high-voltage apparatuses comprising such a compact flange.

BACKGROUND OF THE INVENTION

Gas-insulated switchgear and gas-insulated lines are built from several up to many hundreds of components, including a number of busbar tubes connected to each other. Each component has its own housing, which is connected to the adjacent housing by a flange. The connections by flanges must assure mechanical stability, gas-tightness and enclosure current flow. Thus, the flanges are typically pressed onto each other with a high force, which is applied by using several screw or bolt connections distributed around the circumference of the flanges. The screw connections may be screw-nut connections, or the screw may cooperate with a thread in the cooperating flange, or may be a bolt with two nuts. The screws and bolts are provided in respective holes in the flanges. Sufficient access to the bolts or screws on either side of the flange must be provided for fastening. As the housings act as pressure vessels, strict pressure vessel standards and tests apply which also vary for different countries.

A second method for connecting housings specifically for high voltage gas-insulated lines is to weld them together. The housing ends are machined to allow a welding seam and are welded on-site to form long busbars or lines.

Welding of thin aluminum tubes on-site requires a specific circular welding process to achieve gas-tight and mechanically rigid connections in a construction-site environment. Welded tubes cannot be disassembled in case of a failure or maintenance. However, welded connections require less radial space than flanges, provide lifelong sealing and require less parts for assembly by avoiding separate flanges, bolts, washers and nuts. The insulating spacers, which hold the center conductor concentrically inside the enclosure tube has to be specifically designed to fit into welded enclosures, because welded connections do not have the typical gap to hold the spacer between the bolted flanges.

EP1058363A1, first published on 6 Dec. 2000 in the name of Siemens AG, discloses a welded and releasable flange connection for the metallic enclosure of a gas-insulated system. Two connecting flanges are welded onto the ends of two different enclosure portions. The vertical flat faces of the flanges are then bolted together by a number of axial bolts or screws distributed along the circumference of the enclosure to provide a gas-tight connection.

Thus, for assembly or disassembly of housings, all bolts, nuts and washers must be tightened or loosened. The arrangement of the bolts in the flange holes allows for radial tolerances which may lead to enclosure and conductor not being sufficiently concentric. Radial tolerances may also lead to edges inside the housings, which are detrimental to the dielectric design.

EP2315326A1, first published on 27 Apr. 2011 in the name of ABB Technology AG, discloses a third method for connecting housings for high-voltage gas-insulated switchgear and lines by using a clamp design to connect the housing flanges. The pressure for compressing the gas sealing is achieved by using an angled slope of at least one side of the clamps, which forces the housings to move towards each other axially when tightening the clamp. This requires fewer bolts and less assembly work than for a standard flange. However, the radial space requirement around the clamp-flange connection is as large as in conventional screwed or bolted flanges. Therefore, the clamp-flange is not suitable for space-saving arrangements of three phases in electrical power transmission or distribution systems.

DE3347006A1, first published on 4 Jul. 1985 in the name of Brown Boveri & Cie. AG, alike discloses a medium-voltage gas-insulated switchgear with enclosures that have flanges connected by a clamping ring. The clamping ring has a U-shaped cross section for axially pressing the flat abutting flanges sealingly together. The clamping ring may also press the sealing element radially onto the outside of the flanges thereby prolong the sealing path on the outside of the flanges.

In the known designs, the flanges have flat surfaces that are oriented vertically to the enclosure axis and are provided with a sealing that is axially compressed between the flanges.

SUMMARY OF THE INVENTION

Therefore, it is an object of the invention to provide an improved enclosure for a gas-insulated medium-voltage or high-voltage apparatus, which is very compact and simple to assemble and disassemble. Further aspects of the invention are directed to a gas-insulated medium-voltage or high-voltage apparatus comprising such an enclosure and to a method for producing and assembling such an enclosure.

These objects are achieved by the subject-matter of the independent claims. Some embodiments as given in the dependent claims and claim combinations provide further improvements.

According to the invention, the enclosure is for a gas-insulated medium-voltage or high-voltage apparatus and comprises a first enclosure tube and a second enclosure tube, both having a longitudinal axis and a radial thickness, and therebetween a connection portion for providing a gas-tight connection between a first end of the first enclosure tube and a second end of the second enclosure tube, the connection portion providing a sealing element between the first end and the second end in such a manner that a gas-escape path is sealed in a gas-tight manner, wherein the gas-escape path is formed between the first end and the second end and starts at an inside of the first and second enclosure tube and ends at an outside of the first and second enclosure tube, the gas-escape path has a first segment running along a direction having a directional component parallel to the longitudinal axis, and the sealing element is provided in the first segment.

Such a connection between enclosure tubes has various advantages over known flange systems. No separate flanges are needed to provide a gas-tight connection between the enclosure tubes and the number of parts is very much reduced. The flange design is integrated in the ends of the enclosure tubes. This makes it more compact than known flanges, in particular in radial dimensions, and easier for manufacturing and assembly of the enclosure of the gas-insulated apparatus. The flange design is easily openable or removable, as well.

Both ends of an enclosure tube can have the same first shape or machining (e.g. female on both sides), or both ends of an enclosure tube can have the opposite shape or machining (i.e. male on one side and female on the other side).

Very good results can be achieved by providing the gas-escape paths, when seen in a central length cross section comprising the central longitudinal axis z of the enclosure, between the ends of the enclosure tubes with a non-radial first path segment, or with an at least partially axial path segment.

Very good results can be achieved by providing the shortest gas-escape paths, i.e. the gas-escape paths lacking any tangential component when going from inside to outside of the enclosures tubes, between the ends of the enclosure tubes with a non-radial first path segment, or with an at least partially axial path segment.

Accordingly, such designs allow to prolong the gas-escape paths, or the gas-eslo cape paths which are minimal in radial direction (when seen in the central length cross section of the enclosure), between the ends of the enclosure tubes and thereby to improve the sealing without increasing the radial extent of the integrated flange design. Furthermore, the partially axial orientation of the gas-escape path allows to arrange plural sealing elements or sealing rings in series along the gasesacape path.

The following embodiments include modifications, improvements and/or variations of the protecting member according to the present invention.

In embodiments, plural sealing elements or sealing rings can be arranged in series along the gas-escape path. In embodiments thereof, an inner sealing ring can be chosen from a material and/or shape adapted to characteristics of the insulation gas compartment, such as type of insulation gas, gas pressure, gas temperature, and an outer sealing ring can be chosen from a different material adapted to the characteristics of the outside environment, such as environmental conditions including humidity, temperature, corrosive substances, etc. In addition or as an alternative, at least one of the sealing elements or sealing ring, e.g. an inner or intermediate sealing element or sealing ring, can be chosen from a material and/or shape to prolong diffusion times of small gas molecules, like $CO_2$, $N_2$ or $O_2$ gas molecules. Examples of materials can be EPDM (ethylene propylene diene monomer rubber), NBR (nitril butyl rubber), FEP (perfluorethylene propylene copolymer), PFA (polyfluoroalkoxy copolymer), PTFE (polytetrafluoroethylene), or other.

In embodiments, an outer and/or intermediate sealing element can be chosen from EPDM or PTFE which inter alia provide a wide temperature range; and/or an intermediate and/or inner sealing element can be chosen from NBR which inter alia provides chemical resistance, e.g. against alternative synthetic insulation gases, such as fluoro- or chloro-containing insulation gases, e.g. fluoroketones or fluoronitriles.

In embodiments, one or more radial sealing rings can be provided. Radial sealing rings enforce coaxial alignment of the first and second enclosure tube and can compensate for eventual machining tolerances.

In embodiments, the gas-escape path has a second segment running along a direction having a directional component along the radius of the enclosure, in particular that the second segment comprises an inner second segment starting from the inside of the enclosure and an outer second segment ending at the outside of the enclosure.

In embodiments, the gas-escape path, when seen in a cross-section of the enclosure comprising the longitudinal axis, can have a meandering shape having at least two opposite bends, in particular an S-shape or a U-shape or a C-shape.

In embodiments, the gas-escape path consists of the inner second segment running radially, the first segment running parallel to the longitudinal axis, and the outer second segment running radially.

In embodiments, the connection portion provides a radial compression force onto the sealing element for sealing the gas-escape path.

In embodiments, the connection portion provides an axial holding force for holding the first end and the second end together.

In embodiments, the connection portion comprises a first insert part joined, in particular by a welding connection, to the first end and a second insert part joined, in particular by a welding connection, to the second end. This allows to choose the first and/or second enclosure tube with a reduced thickness d', for example of 5 mm to 10 mm, more preferred 6 mm to 8 mm.

In embodiments, the first end comprises a first connection face and the second end comprises a mating second connection face, and the gas-escape path is formed between the first connection face and the second connection face, in particular that the gas-escape path is formed by shortest paths extending from the inside to the outside of the enclosure tubes.

In embodiments, the first and second connection face have mating bent shapes with complementary bends, in particular the shapes being selected from: a meandering shape with at least two opposite bends, such as an S-shape; a U-shape; a C-shape; and combinations thereof.

In another aspect of the enclosure, it comprises a first enclosure tube and a second enclosure tube, both having a longitudinal axis and a radial thickness, and therebetween a connection portion for providing a gas-tight connection between a first end of the first enclosure tube and a second end of the second enclosure tube, wherein a first connection face, in particular a first protrusion and/or a first recession, is or are produced, in particular machined, into the first end, and a second mating connection face, in particular a second protrusion and/or a second recession, is or are produced, in particular machined, into the second end.

The first and second ends can be machined on an inner enclosure tube diameter such that the first enclosure tube can be slid inside the second enclosure tube, which forces them to axial alignment.

In embodiments, before producing or machining the first and second connection face, the first end has the same inner and outer diameter as the first enclosure tube; and/or the second end has the same inner and outer diameter as the second enclosure tube; and/or the first end and the second end have the same inner and outer diameter, respectively.

In embodiments, the first and second enclosure tube and the connection portion, in particular the first and second connection faces, are made from metal, preferably aluminum. Examples for this are aluminium type EN-AW 6082 or EN AW 6060.

In embodiments, a ring-shaped fixation bracket with U-shaped cross section can be provided around the connection portion. The fixation bracket or briefly bracket can have one axial cut to allow widening of the bracket for assembly. The bracket is widened for sliding over one of the enclosure tubes. After matching with the second enclosure tube into the final matching position, the bracket clicks or snaps into rectangular grooves or indentures to hold them in place in this defined matching position.

In embodiments, a securing bar may be fixed across the axial cut of the bracket after the bracket is clicked into the grooves or indentures. This improves a proper assembly the bracket and to keep the bracket in place. Fixing the securing bar can be done by bolting, stamping, a pin in a hole or any other locking mechanism. The securing bar is also useful as an assembly check, as it cannot be fixed, if the bracket is not fully locked into the tube grooves.

Other embodiments relate to sealing the connection portion or flange after bracketing. This can be achieved by sliding a heat-shrink tube over the assembled flange. This is possible, as the bracket outer diameter is only slightly bigger than the tube outer diameter. After shrinking, the heat-shrink tube can provide a seal to outside environment and specifically can avoid water and dust ingress into the flange. The heat shrink tube can also help to keep the flange and the securing bar in place.

In embodiments, a spacer can be kept in place inside the connection portion or flange. This can be accomplished by a groove on the inside diameter of the inside of the enclosure, in particular of the first enclosure tube. The spacer can be placed in this groove before matching the first enclosure tube with the second enclosure tube. After matching the enclosure tubes, the spacer is trapped in this groove and kept in place. Both faces of the grooves may have radial edge blends to smoothen the electric field inside the enclosure.

The enclosure can also comprise in embodiments a length compensation element and/or a flexible-angle unit, which can be arranged between two of the enclosures tubes, in particular at one of the connection portions of the first and second enclosure tubes.

In embodiments, the length compensation element can be arranged at one of the connection portions of the first and second enclosure tubes, wherein the first segment of the gas-escape path is running parallel to the longitudinal axis of the first and second enclosure tubes, and at both ends of the first segment an axial expansion gap is provided for allowing relative movement of the first end of the first enclosure tube and the second end of the second enclosure tube, in particular for compensating thermal elongation or contraction or axial length tolerances of the first and/or second enclosure tubes without compromising the gas-tight sealing between the first end and the second end.

In embodiments, the first and second enclosure tubes and/or the connection portion is or are built from a uniform material and/or without steel and/or without cast parts and/or without welded parts. This simplifies the manufacturing. By using uniform material, surface roughness can easier be controlled or made uniform, as well. This improves the dielectric behavior inside the enclosure, in particular inside the connection portion or in regions of the insulating spacer or of the length compensation element.

In embodiments, the enclosure is designed for being pressurized with insulation gas at 3 bar to 12 bar, more preferred 6 bar to 10 bar.

In embodiments, the enclosure is designed or is used as an alternative or replacement of electric medium-voltage or high-voltage cables.

In a further aspect, a gas-insulated medium-voltage or high-voltage apparatus comprising an enclosure as disclosed herein is claimed. For example, the gas-insulated apparatus can be selected from: gas-insulated switchgear (GIS), such as disconnectors, circuit breakers, covers, bushings, cable terminations, connection elements, busbar or other, and gas-insulated lines (GIL). In embodiments, the gas-insulated apparatus can comprise or consist of gas-insulated components using a pressurized insulation gas selected from the group consisting of: air, $N_2$, $CO_2$, $SF_6$, alternative synthetic insulation gases, and mixtures thereof.

In a yet further aspect, a method for producing and assembling an enclosure, in particular an enclosure as disclosed herein, for a gas-insulated medium-voltage or high-voltage apparatus, comprising the method elements of:

a. producing, in particular machining, into a first end (20) of the first enclosure tube a first connection face,
b. producing, in particular machining, into a second end of the second enclosure tube a mating second connection face,
c. providing the first end with one or more sealing rings arranged at the first connection face, and
d. thrusting the first and mating second connection faces into one another thereby providing a gas-tight connection portion between the first and second enclosure tube.

In embodiments, the method comprises the method elements of:

e. providing a ring-shaped bracket having a diameter and axial width adapted to the first and second enclosure tube and having an axial slit,
f. elastically radially open the bracket at the axial slit, put the bracket over the connection portion and let it elastically radially close again to provide an axial holding force to hold the first and second enclosure tubes together and/or to provide sliding tolerance of the first end relative to the second end.

In embodiments, the method comprises the method elements of:

g. producing, in particular machining, indentures in the first and second enclosure tube,
h. producing, in particular machining, the bracket with inward rims that mate with the indentures in the first and second enclosure tube, and
i. let the bracket snap fit into the indentures in the first and second enclosure tube to provide the axial holding force to hold the first and second enclosure tube together and/or to provide sliding tolerance of the first end relative to the second end.

In embodiments of the method, the first end, excluding the first connection face, has the same inner and outer diameter as the first enclosure tube and the first connection face is machined, in particular produced, to be slimmer in diameter than the first enclosure tube.

In embodiments of the method, the second end, excluding the second connection face, has the same inner and outer diameter as the second enclosure tube, and the second connection face is produced, in particular machined, to be slimmer in diameter than the second enclosure tube. In embodiments, the first end and the second end can have the same inner and outer diameter, respectively.

In this application, the terms "radial", "axial", "central length cross section", circumferential" refer to a longitudinal axis z of the enclosure, or in other words to a substantially cylindrical shape or symmetry of the enclosure.

It is to be understood that both the foregoing general description and the following detailed description present embodiments with optional features, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain in examples the principles and operation of the concepts disclosed.

BRIEF DESCRIPTION OF THE DRAWINGS

The herein described invention will be more fully understood from the detailed description given herein below and the accompanying drawings which should not be considered to be limiting to the invention described in the appended claims. The drawings are showing in:

DESCRIPTION OF THE EMBODIMENTS

Reference will now be made in detail to certain embodiments, examples of which are illustrated in the accompanying drawings, in which some, but not all features are shown. Embodiments disclosed herein may be embodied in many different forms and should not be construed as being limiting; rather, these embodiments are provided so that this disclosure will satisfy applicable legal requirements. Whenever possible, like reference numbers will be used to refer to like components or parts.

Figure 1:
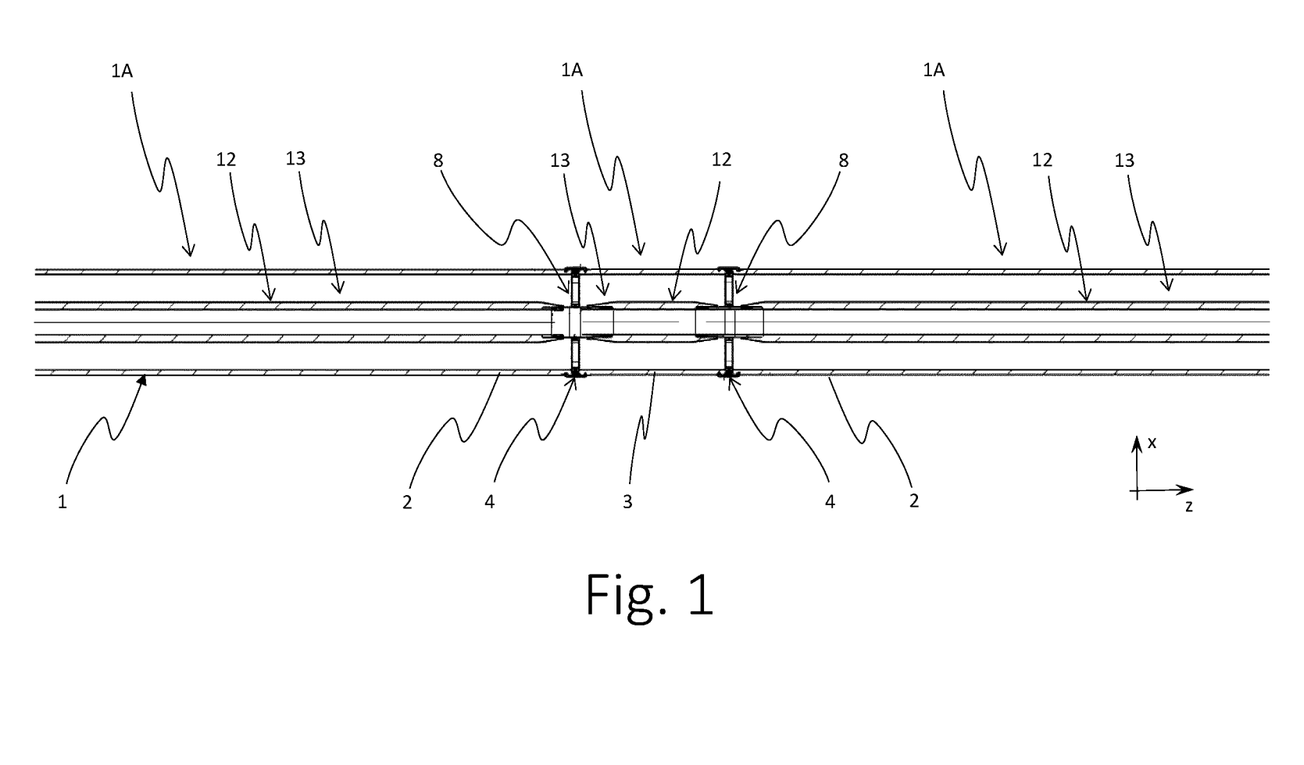
FIG. 1 a cross-sectional side view of a single-phase gas-insulated line (GIL) according to the invention.

FIG. 1 shows a gas-insulated line (GIL) in lengthwise cross section. A gas-tight enclosure preferably made from metal has busducts 1A or busduct segments 1A that comprise first and second enclosure tubes 2, 3 connected together at the two connection portions 4 or flanges 4. The enclosure 1 houses a central conductor 12 that is suspended in insulation gas compartments 13, thereby forming a single-phase encapsulated gas-insulated line 1 or generally gas-insulated apparatus 1.

The busduct enclosure tubes 2, 3 are solidly grounded and electrically connected to each other. The conductors 12 are connected to the high-voltage source. The inside volumes 13 of the busducts 1A are filled with an insulation gas, such as air, $CO_2$, $N_2$, $SF_6$ or insulation gas mixtures at elevated pressure. Typical insulation gas pressures are in a range from 3 bar to 10 bar.

In embodiments, the disclosed integrated flange design may be used to connect also gas-insulated switchgear components other than a gas-insulated line, such as: circuit breakers, disconnectors, busbars, earthing switches, compensator elements, angle connections, end covers, etc.

Figure 2:
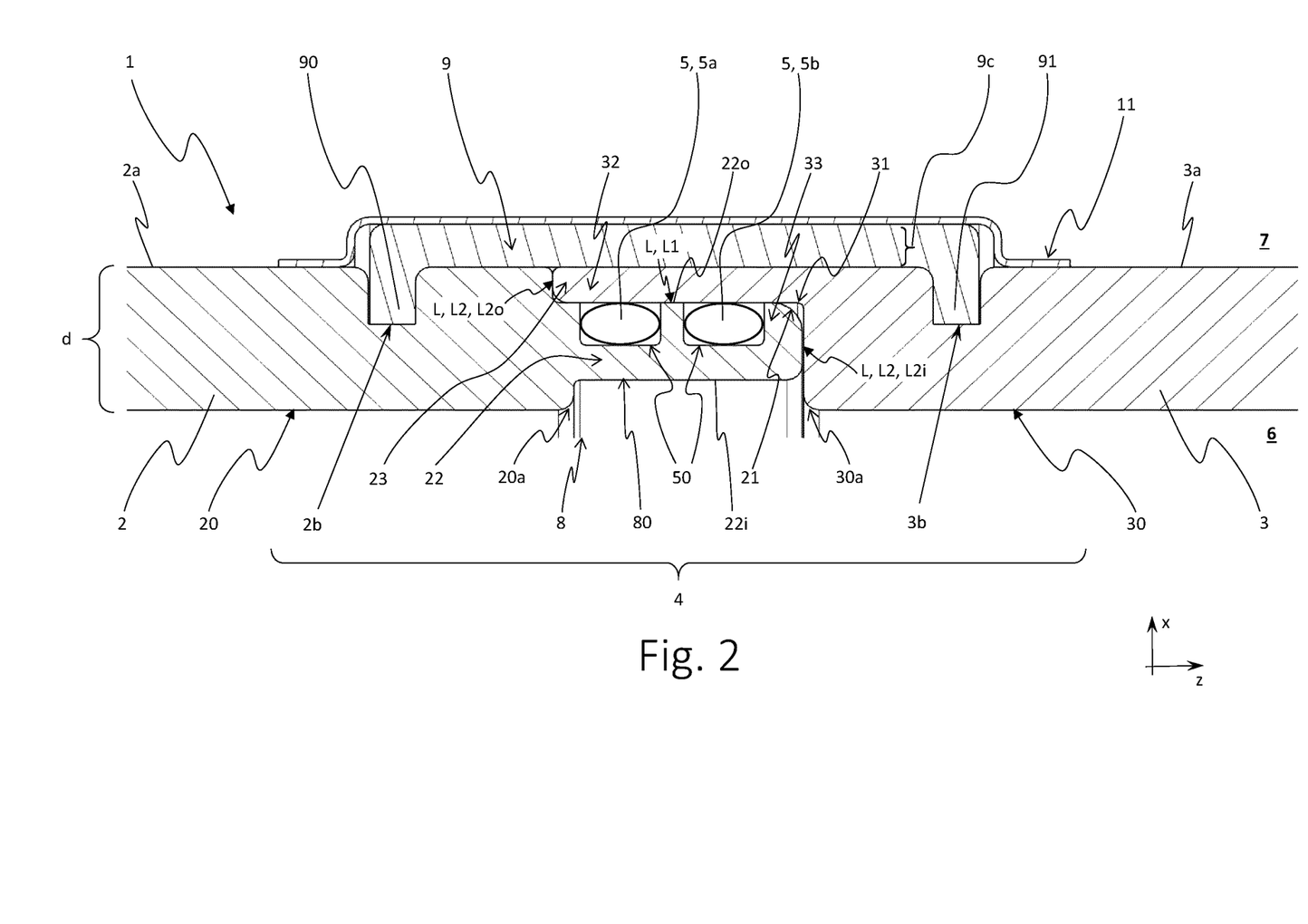
FIG. 2 a detail view from FIG. 1 showing a partial cross-sectional side view of an embodiment of the integrated flange design.

In connection with FIG. 2, the enclosure tubes 2, 3 have a connection portion 4 or integrated flange 4 arranged there-between. In the embodiment shown, the first connection face 21 can comprise a first protrusion 22 at the inside 6 and a first recession 23 at the outside 7 of the enclosure 1, and the second connection face 31 can comprise a second protrusion 32 at the outside 7 mating with the first recession 23 and a second recession 33 at the inside 6 of the enclosure 1 mating with the first protrusion 22 to form the gas-escape path L. The first protrusion 22 can have on its outer face 22o oriented towards the second protrusion 32 at least one sealing groove 50 running circumferentially for therein arranging at least one sealing ring 5a; 5b of the sealing element 5. The first protrusion 22 can comprise two or more sealing grooves 50 arranged in series along the gas-escape path L for therein arranging two or more sealing rings 5a, 5b of the sealing element 5.

As shown in FIG. 2, the gas-escape path L can consist of the inner second segment L2i running radially, the first segment L1 running parallel to the longitudinal axis z, and the outer second segment L2o running radially. More generally, the first segment L1 shall have an at least partially axial direction or a non-radial direction of the enclosure, when seen in a cross-sectional area of the enclosure comprising the longitudinal axis z.

The sealing element 5; 5a, 5b can comprise two or more sealing rings 5a, 5b made from same or different materials, e.g. EPDM, NBR, FEP, PFA, PTFE or other, and/or made in same or different shapes, e.g. O-shape or X-shape.

In embodiments, a sealing ring or O-ring 5b of a material best suited to the inside gas or its gas decomposition products may be used in the inside sealing groove 50. Another sealing ring or O-ring 5a of a different material, which best fits to be tight against the outside gas (which will mostly be air) and/or to the required temperature range may be used in the outside sealing groove 50.

In embodiments, grease may be applied to the sealing elements or O-rings for easier sliding during assembly and disassembly and to maintain their flexibility over lifetime which may be several decades. As well, contact grease may be applied to the bracket grooves 2b; 3b, 3b' during assembly to maintain good electrical contact and low electrical contact resistance between the bracket 9, 9' and the first and second enclosure tubes 2, 3.

The first connection face 21, in particular its first protrusion 22, can have on its inner face 22i oriented towards the inside 6 of the enclosure 1 a spacer groove 80 for receiving and fixing an outer portion of an insulating spacer 8, in particular a disc-shaped supporting insulator 8 or a disk-shaped compartment insulator 8 or two or three post-type insulators, for holding the conductor 12 centered inside the enclosure 1. The spacer groove 80 can be provided with rounded edges 20a, 30a produced or machined into the first and second enclosure tubes 2, 3 with specified radii for dielectric stress relief at triple points between the enclosure 1, the insulation gas compartment 13 and the insulating spacer 8, as well as in the insulating spacer 8 of the gas-insulated medium-voltage or high-voltage apparatus.

In embodiments, the first connection face 21, in particular the first protrusion 22 and/or the first recession 23, can be produced or machined into the first end 20 of first enclosure tube 2. The second connection face 31, in particular the second protrusion 32 and/or the second recession 33, can be produced or machined into the second end 30 of the second enclosure tube 3.

In embodiments, the first end 20 and the second end 30, in particular the first connection face 21 and the second connection face 31, are slideable into one another for joining, in particular axially overlappingly and gas-tightly joining, the first enclosure tube 2 to the second enclosure tube 3. Slidability for joining also allows for slideable removal of the integrated flange connection disclosed herein. For example, the first and second connection faces 21, 31 can have mating cylindrical or conical shapes to assure slidability into or onto each other and to provide an axial overlap and gas-tight sealing.

Thus, FIG. 2 shows: the first enclosure tube 2 being machined on the right end 20 to have a bracket groove 2b, O-ring grooves 5a, 5b, and a spacer groove 80 on the inside 6. A matching surface or first connection face 21 on the outer diameter provides a defined contact point for matching with the second end 3 or second connection face 31 of the second enclosure tube 3. The other end of the first enclosure tube 2 (not shown) may have the same machining or the machining of the second enclosure tube 3. Furthermore, a spacer 8 may be placed in the spacer groove 80 of the first enclosure tube 2. One or more O-rings 5a, 5b may be placed in the O-ring grooves 50 for sealing of the gas compartment 13.

The second enclosure tube 3 is machined with a similar bracket groove 3b; 3b' and additionally at the left end 30 or second connection face 31 on the inside diameter to match and slide over the O-ring surface 5a, 5b of the first enclosure tube 2. When engaged with the first enclosure tube 2, the second enclosure tube 3 is forced to axial alignment, and it squeezes the O-rings 5a, 5b radially into the O-ring grooves 50. The other end of the second enclosure tube 3 (not shown) may have the same machining or the machining of the first enclosure tube 2. A spacer 8 placed in the spacer groove 80 will be locked in position by the second enclosure tube 3.

Both enclosure tubes 2, 3 can have the same outer and inner diameter before machining. Typical enclosure diameters for high-voltage switchgear enclosures are 150 mm to 600 mm. Favorable enclosure tube thicknesses are chosen in a range from 6 mm to 15 mm.

The bracket grooves or indentures 2b; 3b, 3b' may be of rectangular cross section (as shown) or of differently shaped cross sections, which have at least a flat side section towards the matching surface of the second connection face 31.

Figure 3:
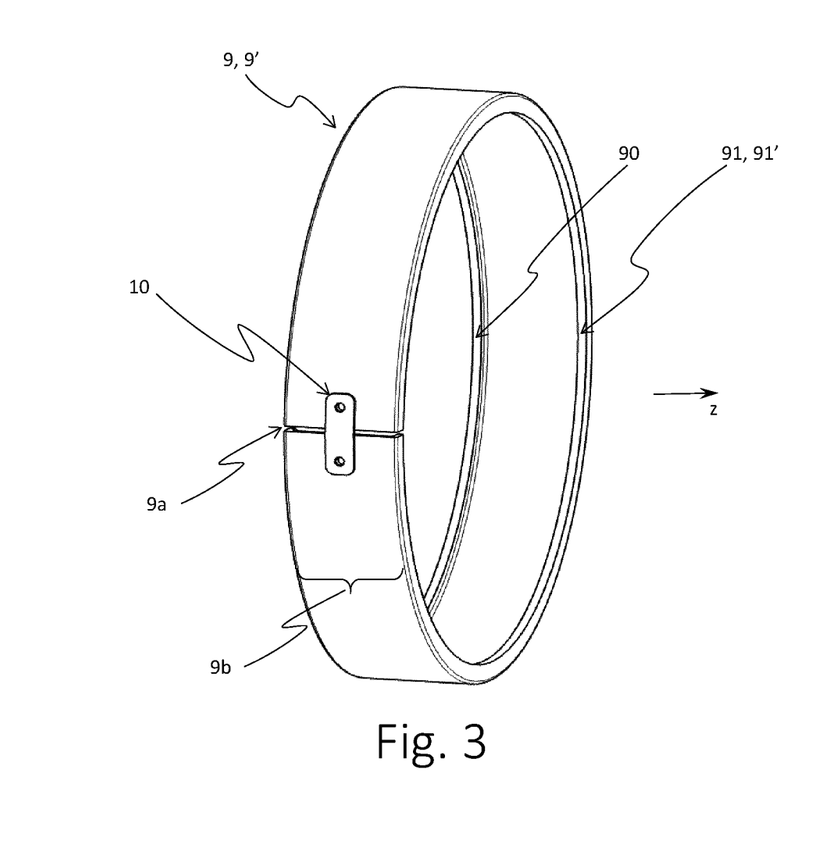
FIG. 3 a perspective view of an embodiment of a bracket for surrounding and securing the connection portion.
Figure 6:
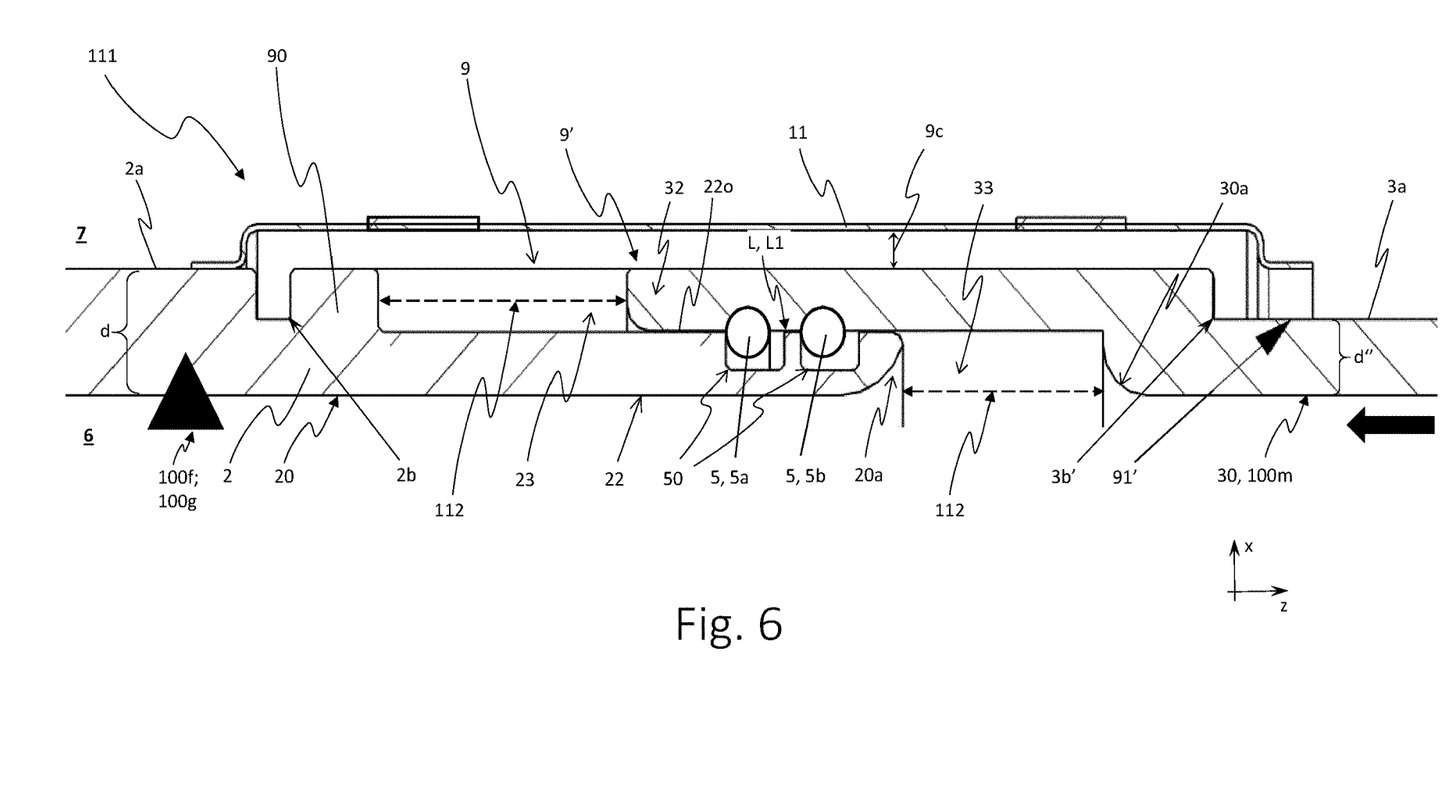
FIG. 6 an embodiment of an integrated flange connection being designed as a length compensation element.

FIG. 2 in connection with FIG. 3 and also FIG. 6 shows that the connection portion 4 can comprise a fixation bracket 9, 9' surrounding the first end 20 and the second end 30. One purpose of the bracket 9, 9' is to provide an axial holding force for better holding the first end 20 and the second end 30 together. The bracket 9, 9' can have a partial ring shape with an axial slit 9a, which allows for an elastic snap fit of the bracket 9, 9' onto the connection portion 4. The bracket 9, 9' can have an axial bracket width 9c (definable e.g. between a first rim 90 and a second rim 91, 91') that covers and is lengthwise matched to the connection portion 4, or alternatively that is made longer than the connection portion 4 to improve a mutual axial alignment of the first and second enclosure tube 2, 3 or to compensate for thermal length extension of the enclosure 1. In embodiments, the axial slit can have a slid width in a range of 0.2 mm to 25 mm, preferred in a range of 5 mm to 15 mm. This allows insertion of a suitable tool for mounting and/or removing the bracket 9, 9' to and from the connection portion 4.

As shown in FIG. 3 or 6, the bracket 9, 9' can have at one axial rim position an inward, at least partially circumferential, first rim 90 and at another axial rim position an inward, at least partially circumferential, second rim 91, 91', and the first enclosure tube 2 can have at its outside face 2a a first indenture 2b for receiving the first rim 90, and the second enclosure tube 3 can have at its outside face 3a a second indenture 3b, 3b' for receiving the second rim 91, 91', thereby the bracket 9, 9' providing the axial holding force for holding the first end 20 and the second end 30 together. Exemplary choices of material for the bracket 9, 9' can be: metal, e.g. aluminum, preferably aluminium type EN-AW 6082 or EN AW 6060, or copper, or other conductive materials. This allows to conduct enclosure currents efficiently from the first enclosure tube 2 via the bracket 9. 9' to the second enclosure tube 3. In embodiments, the first and second indentures 2b; 3b, 3b' are a rectangular typically circumferential groove, and the first and second rim 90; 91, 91' have a mating rectangular cross section to fit into the first and second indenture 2b; 3b, 3b', respectively.

The widening of the bracket 9, 9' shall be limited to the elastic phase of the bracket 9, 9' so that it keeps tight contact to the first and second enclosure tubes 2, 3 when clicked into the indentures 2b; 3b, 3b', thereby resuming its original shape. The bracket 9, 9' can have a flat surface on its rims 90; 91, 91', as it only keeps the first and second enclosure tubes 2, 3 matched. The radial sealings (O-rings) 5; 5a, 5b are squeezed by matching the two enclosure tubes 2, 3. No axial sealings are required and therefore no axial pressing force is need, which is incontrast to using conventional clamp flanges.

The cross section of the U-shaped bracket 9, 9' provides the required strength to keep the two tubes 2, 3 together against the push force from inside pressure. As typical diameters for high-voltage equipment enclosures are several hundred mm, the cross section of the bracket 9, 9' becomes very large, even if a small thickness is chosen. Therefore, tensile strength requirements on the brackets 9, 9' are rather low and aluminum can be chosen as bracket material.

Aluminum as a bracket material is advantageous, as it establishes a low electrical resistance and high-current connection between the two enclosure tubes 2, 3. When a flange according to the above aspects is assembled and the enclosure 1 is pressurized inside 6 (i.e. in the insulation gas compartment 13), both tubes 2, 3 will exert opposing axial forces on the bracket 9, 9'. This establishes a high contact force between the tube groove walls 2b; 3b, 3b' and the bracket rims 90; 91, 91'. This enables carrying high enclosure currents via the bracket 9, 9'. The contact force is provided by the inside pressure in the insulation gas compartment 13.

Figure 5:
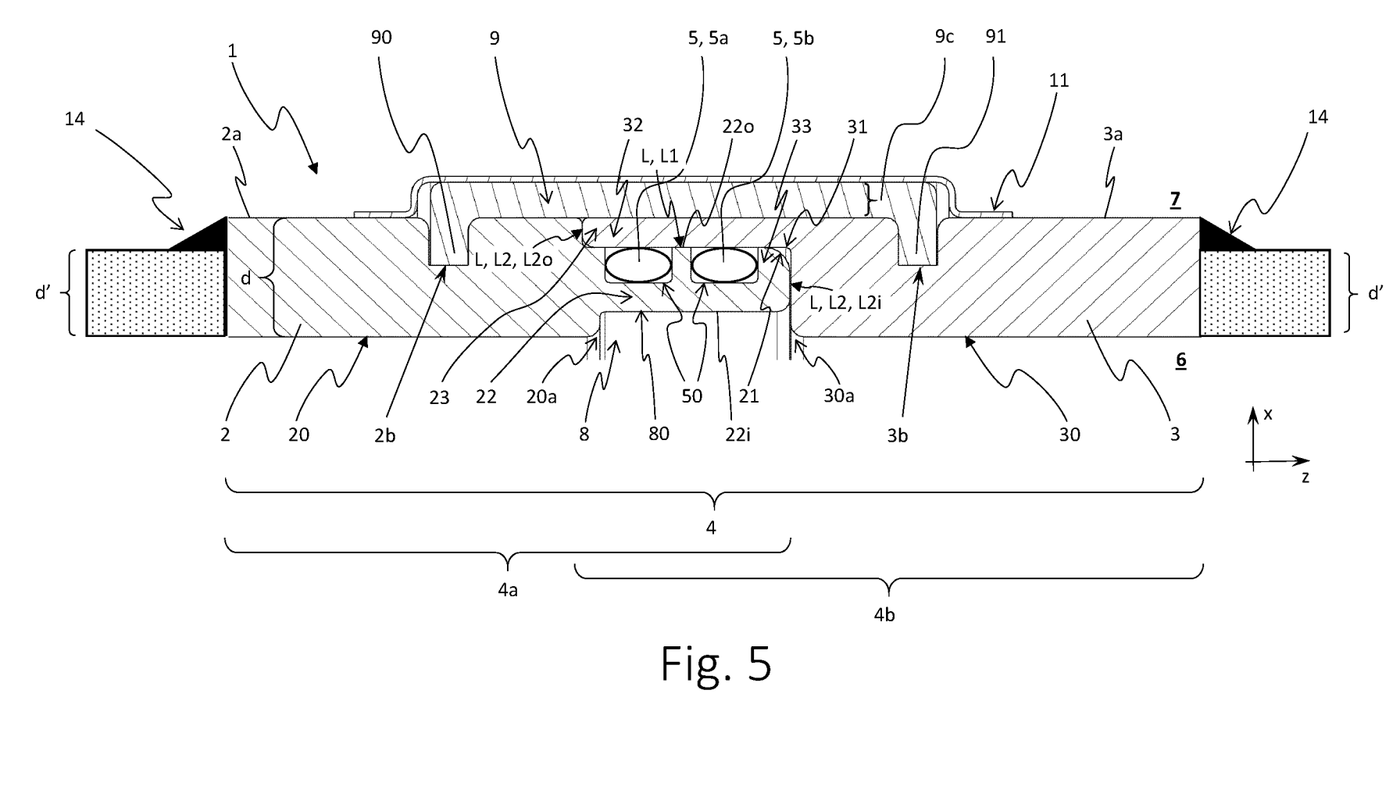
FIG. 5 an embodiment of an integrated flange connection being designed as an insert part being welded to the ends of the enclosure tubes.

Thus, FIG. 3 or FIG. 5 or FIG. 6 show with respect to the bracket 9, 9' in an exemplary manner the following: The ring-shaped bracket 9, 9' has an (upside down) U-shaped cross section with a bracket tooth or rims 90; 91, 91' on each side. The bracket teeth or rims 90; 91, 91' match in size and distance with the bracket grooves or indentures 2b; 3b, 3b' that are machined on the first and second enclosure tubes 2, 3, respectively, in the engaged position. The bracket 9, 9' has an axial cut or slit 9a, which allows it to widen to a diameter larger than the outer diameter of the enclosure tubes 2, 3. The bracket 9, 9' is widened for assembly and slides over one of the enclosure tubes 2, 3. After matching the enclosure tubes 2, 3, the bracket 9, 9' can be matched with the bracket grooves or indentures 2b; 3b, 3b' and can be clicked into them. As the bracket 9, 9' has been elastically deformed for widening, it will regain its original diameter and shape when resting in the grooves or indentures 2b; 3b, 3b'.

The bracket 9, 9' provides mechanical fixation of the enclosure tubes 2, 3 as well as an electrical connection for enclosure currents between the enclosure tubes 2, 3. The walls of the bracket grooves or indentures 2b; 3b, 3b' will be pressed onto the bracket teeth or rims 90; 91, 91' by the elevated inside gas pressure. The bracket cross section, in particular axial width 9b and radial thickness 9c, shall be chosen to provide sufficient tensile strength against the push forces from inside pressure for bursting pressure tests. The bracket cross section has also to be sufficient to carry the maximum enclosure current. Both can be achieved with a radial thickness 9c in the range of 2 mm to 7 mm.

As shown in FIG. 3, a securing bar 10 can be provided for bridging the axial slit 9a in the bracket 9, 9' and thereby fixing the bracket 9, 9' on the connection portion 4. In embodiments or throughout this application, the bracket 9, 9', when mounted on the connection portion 4, does not provide a sealing function for the enclosure 1 or at the connection portion 4 or between the ends 20, 30 of the first and second enclosure tubes 2, 3. In particular the bracket 9, 9' does not form part of or prolong the gas-escape path L. The securing bar 10 can allow for an assembly check of proper location of the bracket 9, 9' in the indentures 2b, 3b.

The securing bar 10 is an optional security measure. It can be fixed to the outside of the bracket 9, 9' for crossing its axial cut or slit 9a. The securing bar 10 can be fixed by bolts or pins or screws to the bracket 9, 9' on either side of the axial cut 9a. Preferably, holes of the securing bar 10 can match with holes or threads of the bracket 9, 9' only, if the bracket 9, 9' is fully engaged in the bracket grooves or indentures 2b; 3b, 3b'. This provides a check for the proper assembly of the bracket. The securing bar 10 may be labeled to indicate the danger of loosening it in case the inside is still pressurized.

Figure 4:
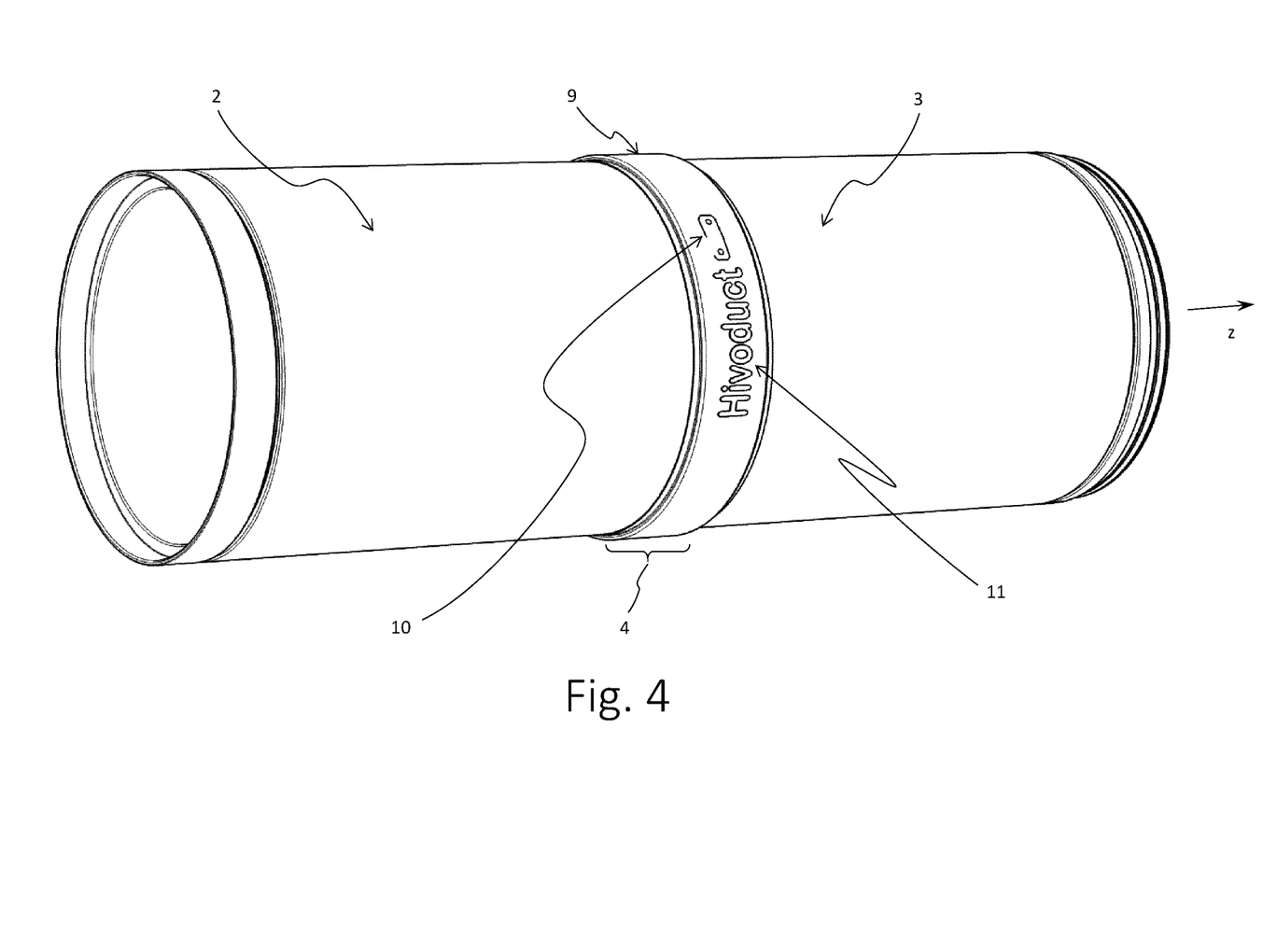
FIG. 4 a perspective outside view of a busduct enclosure with an embodiment of the integrated flange design in an assembled state.

As shown in FIG. 4, a heat shrink tube 11 can be slid and fixed over the connection portion 4, and in particular serves for applying an additional radial compression force onto the sealing element 5; 5a, 5b for improved sealing of the gas-escape path L and/or to inform about intactness of the connection portion 4. In embodiments, the heat shrink tube 11 can be labeled on its outside to inform about the manufacturer, about a future maintenance date and/or to warn about hazards, such as e.g. elevated gas pressure in the enclosure 1 or risk of explosion in case the bracket 9, 9' is removed when the enclosure 1 is under pressure.

The heat shrink tube 11 slides over the flange assembly 4. When heat is applied, the tube 11 shrinks to make tight contact with the enclosure tubes 2, 3 and the bracket 9, 9' and the securing bar 10 (when present). This seals the connection portion or integrated flange 4 against ingress of water or dust or other harmful substances. The tube 11 tightly shrunk around the flange 4 supports the bracket 9, 9' and the securing bar 10 (when present) to stay in place during operation of the enclosure. The heat shrink tube 11 may be labeled with a company logo and additional text to indicate the danger of removing it in case the inside 6 is under pressure.

FIG. 5 is largely similar to FIG. 2 with respect to the inner design of the connection portion 4. As further shown in FIG. 5, the connection portion 4 can comprises a first insert part 4a joined, in particular by a welding connection 14, to the first end 20 of the first enclosure tube 2, and a second insert part 4b joined, in particular by a welding connection 14, to the second end 30 of the second enclosure tube 3. This allows to choose the first and/or second enclosure tube 2, 3 with a reduced thickness d', for example of 5 mm to 10 mm, more preferred 6 mm to 8 mm.

In embodiments, the enclosures can comprise a length compensation element 111 and/or a flexible-angle unit (not shown herein in detail), which is or are arranged between two of the enclosures tubes 2, 3, in particular at one of the connection portions 4 of the first and second enclosure tubes 2, 3.

An example of such a length compensation element 111 is shown in FIG. 6. The length compensation element 111 can be arranged at one of the connection portions 4 of the first and second enclosure tubes 2, 3, wherein the first segment L1 of the gas-escape path L is running parallel to the longitudinal axis z of the first and second enclosure tubes 2, 3, and at both ends of the first segment L1 an axial expansion gap 112 is provided for allowing relative movement of the first end 20 of the first enclosure tube 2 and the second end 30 of the second enclosure tube 3, in particular for compensating thermal elongation or contraction or axial length tolerances of the first and/or second enclosure tubes 2, 3 without compromising the gas-tight sealing between the first end 20 and the second end 30. A bracket 9' alike or similar to the one disclosed in the context of FIG. 2 can be used, which in addition provides sliding tolerance of the first end 20 relative to the second end 30.

Thus, the length compensating element can have the same or similar design as the integrated flange disclosed herein and particularly in FIGS. 2 and 5. The relative movement between the first and second ends 20, 30 is limited by the maximal and minimal axial expansion gap 112 and eventually by a sliding width of the bracket 9'. The length compensating element 111 allows the first and second connection faces 21, 31 to be slidable into each other to compensate for temperature elongation or contraction of the enclosure 1 or busduct 1A or gas-insulated apparatus or gas-insulated line (GIL), in particular between a first end 20 fixed at a longitudinal fixation location 100f or 100g and a movable end 30 or generally movable enclosure part 100m.

As shown in FIG. 6 in connection with FIG. 3, the sliding-tolerant bracket 9' can have at one axial rim position an inward, at least partially circumferential, first rim 90 and at another axial rim position an inward, at least partially circumferential, second rim 91', and the first enclosure tube 2 can have at its outside face 2a a first indenture 2b for receiving the first rim 90, and the second enclosure tube 3 can have at its outside face 3a a second indenture 3b' for receiving the second rim 91', wherein the second indenture 3b' for receiving the second rim 91' is prolonged, e.g. compared to the previous indenture 3b, at least by the length of the axial extension gap 14, and the second rim 91' provides sliding-tolerance on the outside face 3a of the second enclosure tube 3, this in addition to the bracket 9' providing the axial holding force for holding the first end 20 and the second end 30 together.

The enclosure, gas-insulated medium-voltage or high-voltage apparatus, and the method for producing and assembling the enclosure or apparatus can be used for installations in radially confined spaces, e.g. pipes, water pipes, tunnels etc., and/or as alternative or for avoidance or replacement of electrical medium-voltage or high-voltage cables.

LIST OF DESIGNATIONS 1 gas-tight enclosure, metal enclosure
1A busduct, busduct segment, medium-voltage apparatus, high-voltage apparatus
2 first enclosure tube
2a outside face of first enclosure tube
2b first indenture in 2a, rectangular groove
20 first end of first enclosure tube
20a rounded edges
21 first connection face of first end
22 first protrusion of first connection face at inside of enclosure
22i inner face of first protrusion 22o outer face of first protrusion
23 first recession of first connection face at outside of enclosure
3 second enclosure tube
3a outside face of second enclosure tube
3b, 3b' second indenture in 3a, rectangular groove
30 second end of second enclosure tube
30a rounded edges
31 second connection face of second end
32 second protrusion of second connection face at outside of enclosure
33 second recession of second connection face at inside of enclosure
4 connection portion
4a first insert part of connection portion
4b second insert part of connection portion
5 sealing element, sealing ring
5a first sealing ring, outside sealing ring, O-ring
5b second sealing ring, inside sealing ring, O-ring
50 sealing groove
6 inside of the enclosure tubes
7 outside of the enclosure tubes
8 spacer, post-type insulator, disk-shaped insulator, supporting insulator, compartment insulator
80 spacer groove
9 bracket
9' prolonged bracket, sliding-tolerant bracket
9a axial slit in bracket
9b axial extension of bracket, bracket width
9c thickness of bracket (in radial direction)
90 first rim of bracket
91 second rim of bracket
91' modified second rim, sliding rim of bracket
10 securing bar
11 heat shrink tube
12 conductor
13 insulation gas compartment
14 insert connection, welded connection
100f first longitudinal fixation position
100g second longitudinal fixation position
100m movable enclosure part
111 length compensation element, length compensation unit
112 axial expansion gap
d radial thickness of enclosure tubes or of their ends
d' radial thickness of connection portion (insert) of enclosure tubes
d" reduced radial thickness of enclosure tube
L gas-escape path
L1 first segment of gas-escape path with axial directional component
L2 second segment of gas-escape path with radial directional component
L2i inner second segment of gas-escape path starting from inside of enclosure tubes 2, 3
L2o outer second segment of gas-escape path ending at outside of enclosure tubes 2, 3
x, y radial direction of the enclosure or of the medium-voltage or high-voltage apparatus
z longitudinal axis of the enclosure or of the medium-voltage or high-voltage apparatus

The invention claimed is:

1. An enclosure for a gas-insulated medium-voltage or high-voltage apparatus comprising a first enclosure tube and a second enclosure tube, both having a longitudinal axis and a radial thickness, and therebetween a connection portion for providing a gas-tight connection between a first end of the first enclosure tube and a second end of the second enclosure tube,
the connection portion providing a sealing element between the first end and the second end in such a manner that a gas-escape path is sealed in a gas-tight manner, wherein
the gas-escape path is formed between the first end and the second end and starts at an inside of the first and second enclosure tube and ends at an outside of the first and second enclosure tube,
the gas-escape path has a first segment running along a direction having a directional component parallel to the longitudinal axis, and
the sealing element is provided in the first segment,
the connection portion-comprises a bracket surrounding the first end and the second end, and being provided for applying an axial holding force for holding the first end and the second end together,
wherein the bracket has a partial ring shape with an axial slit, which allows for an elastic snap fit of the bracket onto the connection portion.

2. The enclosure according to claim 1, wherein the gas-escape path has a second segment running along a direction having a directional component along the radius of the enclosure, the second segment comprises an inner second segment starting from the inside of the first and second enclosure tubes and an outer second segment ending at the outside of the first and second enclosure tubes; and wherein the gas-escape path, when seen in a cross-section of the enclosure comprising the longitudinal axis, has a meandering shape having at least two opposite bends, in particular an S-shape; or wherein the gas-escape path consists of the inner second segment running radially, the first segment running parallel to the longitudinal axis, and the outer second segment running radially.

3. The enclosure according to claim 1, wherein the connection portion provides a radial compression force onto the sealing element for sealing the gas-escape path (L), and the connection portion provides an axial holding force for holding the first end and the second end together.

4. The enclosure according to claim 1, wherein the first end comprises a first connection face and the second end comprises a mating second connection face, and the gas-escape path is formed between the first connection face and the second connection face.

5. The enclosure according to claim 4, wherein the first connection face and the second connection face have mating bent shapes with complementary bends, in particular the shapes being a meandering shape with at least two opposite bends, such as an S-shape.

6. The enclosure according to claim 4, wherein
the first connection face comprises a first protrusion at the inside and a first recession at the outside of the enclosure,
the second connection face comprises a second protrusion at the outside mating with the first recession and a second recession at the inside of the enclosure mating with the first protrusion to form the gas-escape path, and the first protrusion has on its outer face oriented towards the second protrusion at least one sealing groove running circumferentially for therein arranging at least one sealing ring of the sealing element.

7. The enclosure according to claim 6, wherein the first protrusion comprises two or more sealing grooves arranged in series along the gas-escape path for therein arranging two or more sealing rings of the sealing element.

8. The enclosure according to claim 4, wherein the first connection face, in particular its first protrusion, has on its inner face oriented towards the inside of the enclosure a spacer groove for receiving and fixing an outer portion of an insulating spacer, in particular a disc-shaped supporting insulator or a disk-shaped compartment insulator or two or three post-type insulators, for holding a conductor centered inside the enclosure.

9. The enclosure according to claim 4, wherein the first connection face, in particular the first protrusion and/or the first recession, is or are produced or machined into the first end of first enclosure tube; the second connection face, in particular the second protrusion and/or the second recession, is or are produced or machined into the second end of the second enclosure tube; and the first connection face and the second connection face are slideable into one another for joining the first enclosure tube to the second enclosure tube.

10. The enclosure according to claim 1, wherein the sealing element comprises two or more sealing rings made from same or different materials, e.g. EPDM, NBR, FEP, PFA, PTFE or other, and/or made in same or different shapes, e.g. O-shape or X-shape.

11. The enclosure according to claim 1, wherein the bracket has an axial bracket width that covers and is lengthwise matched to the connection portion or that is made longer than the connection portion to improve a mutual axial alignment of the first and second enclosure tube and/or to compensate for thermal length extension of the enclosure.

12. The enclosure according to claim 1, wherein the bracket has at one axial rim position an inward, at least partially circumferential, first rim and at another axial rim position an inward, at least partially circumferential, second rim, and the first enclosure tube has at its outside face a first indenture, in particular rectangular indenture, for receiving the first rim, and the second enclosure tube has at its outside face a second indenture, in particular rectangular indenture, for receiving the second rim, thereby the bracket providing the axial holding force for holding the first end and the second end together.

13. The enclosure closure according to claim 1, wherein the bracket is made from metal, e.g. aluminum, preferably aluminium type EN-AW 6082 or EN AW 6060, or copper, or from other conductive material to conduct enclosure currents from the first enclosure tube via the bracket to the second enclosure tube.

14. The enclosure according to claim 1, wherein a securing bar is provided for bridging the axial slit in the bracket and thereby fixing the bracket on the connection portion.

15. The enclosure according to claim 1, wherein the bracket, when mounted on the connection portion, does not provide a sealing function for the enclosure or the connection portion, in particular does not form part of or prolong the gas-escape path.

16. The enclosure according to claim 1, comprising a length compensation element and/or a flexible-angle unit, which is or are arranged between two enclosure tubes, in particular at one of the connection portions of the first and second enclosure tube.

17. The enclosure according to claim 16, the length compensation element being arranged at one of the connection portions of the first and second enclosure tubes, wherein
the first segment of the gas-escape path is running parallel to the longitudinal axis of the first and second enclosure tubes, and at both ends of the first segment an axial expansion gap is provided for allowing relative movement of the first end of the first enclosure tube and the second end of the second enclosure tube, in particular for compensating thermal elongation or contraction or axial length tolerances of the first and/or second enclosure tubes without compromising the gas-tight sealing between the first end and the second end, and the bracket provides sliding tolerance of the first end relative to the second end.

18. The enclosure according to claim 17, wherein the bracket is as claimed in claim 12, the second indenture for receiving the second rim is prolonged at least by the length of the axial extension gap, and the second rim provides sliding-tolerance on the outside face of the second enclosure tube.

19. A gas-insulated medium-voltage or high-voltage apparatus comprising an enclosure according to claim 1, the apparatus being selected from: gas-insulated switchgear (GIS), such as disconnectors, circuit breakers, covers, bushings, cable terminations, connection elements, busbar or other, and gas-insulated lines (GIL).

20. A method of producing and assembling an enclosure, in particular an enclosure according to claim 1, for a gas-insulated medium-voltage or high-voltage apparatus, comprising the method elements of:
a. producing, in particular machining, into a first end of the first enclosure tube a first connection face,
b. producing, in particular machining, into a second end of the second enclosure tube a mating second connection face,
c. providing the first end with one or more sealing rings arranged at the first connection face,
d. thrusting the first and mating second connection faces into one another thereby providing a gas-tight connection portion between the first and second enclosure tube,
e. providing a ring-shaped bracket having a diameter and axial width adapted to the first and second enclosure tube and having an axial slit, and
f. elastically radially opening the bracket at the axial slit, putting the bracket over the connection portion and letting it elastically radially close again to provide an axial holding force to hold the first and second enclosure tubes together and/or to provide sliding tolerance of the first end relative to the second end.

21. The method according to claim 20, comprising the method elements of:
g. producing, in particular machining, indentures in the first and second enclosure tube,
h. producing, in particular machining, the bracket with inward rims that mate with the indentures in the first and second enclosure tube, and
i. letting the bracket snap fit into the indentures in the first and second enclosure tube to provide the axial holding force to hold the first and second enclosure tube together and/or to provide sliding tolerance of the first end relative to the second end.

22. The method according to claim 20, wherein the first end, excluding the first connection face, has the same inner and outer diameter as the first enclosure tube and the first connection face is produced, in particular machined, to be slimmer in diameter than the first enclosure tube; and wherein the second end, excluding the second connection face, has the same inner and outer diameter as the second enclosure tube, and the second connection face is produced, in particular machined, to be slimmer in diameter than the second enclosure tube.

23. The method according to claim 20, wherein the first end, excluding the first connection face, and the second end, excluding the second connection face, have the same inner and outer diameter, respectively.

\* \* \* \* \*